(12) United States Patent
Ocke et al.

(10) Patent No.: US 8,095,481 B2
(45) Date of Patent: Jan. 10, 2012

(54) METHOD AND SYSTEM FOR AUTOMATICALLY ADDING NEW CLASS DEFINITIONS TO A CLASSIFICATION SYSTEM

(75) Inventors: Kirk J. Ocke, Ontario, NY (US); Michael David Shepherd, Ontario, NY (US); Dale Ellen Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 804 days.

(21) Appl. No.: 11/901,895

(22) Filed: Sep. 19, 2007

(65) Prior Publication Data
US 2009/0076998 A1    Mar. 19, 2009

(51) Int. Cl.
*G06F 15/18*    (2006.01)
*G06F 17/00*    (2006.01)
(52) U.S. Cl. ................. 706/12; 706/47; 706/45
(58) Field of Classification Search .......... None
See application file for complete search history.

(56) References Cited

U.S. PATENT DOCUMENTS
2006/0253213 A1*    11/2006    Ocke et al. ............... 700/97

OTHER PUBLICATIONS

Ding et al., Y., "GoldenBullet: Automated Classification of Product Data in E-commerce", Business Information Systems 2002, 2002.*
Ding et al., Y., "GoldenBullet in a Nutshell", FLAIRS-02 Proceedings, 2002.*
van der Aalst et al., W., "Inheritance of workflows: an approach to tackling problems related to change", Theoretical Computer Science 270, pp. 125-203, 2002.*
Omelayenko, B., "Integration of Product Ontologies for B2B Marketplaces: A Preview", ACM SIGecom Exchanges, 2000.*
Omelayenko, B., "Syntactic-Level Ontology Integration Rules for E-commerce", FLAIRS-01 Proceedings, 2001.*
Omelayenko, B., "A Two-Layered Integration Approach for Product Information in B2B E-commerce", EC-Web 2001, pp. 226-239, 2001.*
Buckwalter, C., "Integration Patterns Applied to Print Production", Proceedings TAGA, 58th Annual Technical Conference, Vancouver, Canada, pp. 1-15, 2006.*

* cited by examiner

*Primary Examiner* — Jeffrey A Gaffin
*Assistant Examiner* — Adrian Kennedy
(74) *Attorney, Agent, or Firm* — Luis M. Ortiz; Kermit D. Lopez; Ortiz & Lopez, PLLC (57) ABSTRACT

A method and system for automatically classifying a product description into a product type based on a classification system is disclosed. Real product descriptions representing a given product type can be compared with a pre-defined set of characteristics that are relevant to the classification system. The relevant information regarding the classification system is extracted from each of the real product descriptions. The extracted information can then be coalesced and transformed into a new set of classification rules for a new product type. The new classification rules can be used to automatically classify the product descriptions that represent the new product type. The classification system can be a rule based classification system and/or semantic web classification system.

16 Claims, 7 Drawing Sheets

| JDF PRODUCT INTENT | JDF INTENT RESOURCE INFORMATION |
|---|---|
| JDF #1 | BindingType = "Side Stitched"<br>FinishedDimensions = "8.5 x 11 inches"<br>ProcessColorModel = "Monochrome"<br>FrontCover = "Color content on card stock"<br>BackCover = "Color content on card stock" |
| JDF #2 | BindingType = "Corner Stitched"<br>FinishedDimensions = "9 x 11 inches"<br>ProcessColorModel = "Monochrome"<br>FrontCover = "None"<br>BackCover = "None" |
| JDF #3 | BindingType = "Corner Stitched"<br>FinishedDimensions = "8.5 x 11 inches"<br>ProcessColorModel = "Monochrome"<br>FrontCover = "None"<br>BackCover = "None" |
| JDF #4 | BindingType = "Side Stitched"<br>FinishedDimensions = "8.5 x 11 inches"<br>ProcessColorModel = "Monochrome"<br>FrontCover = "Color content on card stock"<br>BackCover = "Monochrome content on card stock" |
| JDF #5 | BindingType = "Side Stitched"<br>FinishedDimensions = "8.5 x 11 inches"<br>ProcessColorModel = "Monochrome"<br>FrontCover = "None"<br>BackCover = "None" |

JDF PRODUCT INTENT RESOURCE INFORMATION

OK  CANCEL

EXTRACTED CLASSIFICATION CHARACTERISTICS — 600

| JDF PRODUCT INTENT (410) | CLASSIFICATION CHARACTERISTICS (WITH VALUES) (620) |
|---|---|
| JDF #1 | BINDING = "Side Stitched"<br>DIMENSIONS = "8.5 x 11 inches"<br>COLOR_MODEL = "Monochrome"<br>HAS_COVERS = "True" |
| JDF #2 | BINDING = "Corner Stitched"<br>DIMENSIONS = "9 x 11 inches"<br>COLOR_MODEL = "Monochrome"<br>HAS_COVERS = "False" |
| JDF #3 | BINDING = "Corner Stitched"<br>DIMENSIONS = "8.5 x 11 inches"<br>COLOR_MODEL = "Monochrome"<br>HAS_COVERS = "True" |
| JDF #4 | BINDING = "Side Stitched"<br>DIMENSIONS = "8.5 x 11 inches"<br>COLOR_MODEL = "Monochrome"<br>HAS_COVERS = "True" |
| JDF #5 | BINDING = "Side Stitched"<br>DIMENSIONS = "8.5 x 11 inches"<br>COLOR_MODEL = "Monochrome"<br>HAS_COVERS = "False" |

[OK] (630)  [CANCEL] (640)

METHOD AND SYSTEM FOR AUTOMATICALLY ADDING NEW CLASS DEFINITIONS TO A CLASSIFICATION SYSTEM

TECHNICAL FIELD

Embodiments are generally related to data processing methods and systems. Embodiments are also related to intent to process conversion systems and also relate to print product descriptions. Embodiments are additionally related to methods and systems for automatically adding new product types to a classification system.

BACKGROUND OF THE INVENTION

JDF (Job Definition Format) is an open, extensible, XML-based print workflow specification framework. It ties together authoring, production, management, manufacturing, delivery, and MIS (Management Information System) control. JDF provides product intent descriptions as a means to describe a final product—such as a business card—independent of the processing steps required to manufacture the product. JDF product intent is a formal product description. JDF describes the processing steps required for pre-press, print and post-press tasks via processes and resources. It consists of nodes representing each process step, as well as groups of nodes representing sequential or parallel processing steps. A node may represent an entire job, a product component, a group of processes, or a single process. JDF also consists of resources, which are the input and output of nodes (processes) such as PDF files, process parameters, and consumables.

Classifying a product description, provided by a customer of a print shop, into the vocabulary (ontology) of the print shop is typically performed in a completely ad-hoc manner. Product description formats, such as JDF product intent nodes, are intended to formalize the description of a product to make translation to a workflow easier. However, the use of formal product descriptions can make manual classification more difficult since a person is usually required to interpret the formal product description constructs visually, that is, by reading them. Since such constructs are not typically meant to be human-readable this can be a difficult task and prone to error. Known methods of classifying print product descriptions are therefore based on random or improvised approaches, which cannot reliably and accurately provide the most appropriate classification and which, therefore, result in inefficient and time consuming classification of the print product descriptions.

Therefore automated classification of formal product descriptions, such as JDF product intent nodes, is desirable. However, even in automated workflow systems that classify JDF product intent as a particular product type, adding new product types and the rules to classify product descriptions as the new product type is a manual process and it requires significant knowledge of the underlying rules-based system. This is a barrier when deploying this technology at customer sites since the customer is not an expert on the underlying rules-based classification system.

Based on the foregoing it is believed that a need exists for an improved method for automatically classifying print product descriptions into a product type utilizing a classification system. Additionally, a need exists for providing a methodology which enables print product descriptions to be effectively and rapidly incorporated into a system of classification.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data processing method and system.

It is another aspect of the present invention to provide for an improved intent to process conversion system.

It is a further aspect of the present invention to provide for an improved method and system for automatically adding a new product type to a classification system.

The aforementioned aspects and other objectives and advantages can now be achieved as described herein. A method and system for automatically classifying a product description into a product type based on a classification system is disclosed. Real product descriptions representing a given product type can be compared with a pre-defined set of characteristics that are relevant to the classification system. The relevant information regarding classification is extracted from each of the real product descriptions. The extracted information can then be coalesced and transformed into a new set of classification rules for a new product type. The new classification rules can be used to automatically classify any product descriptions that represent the new product type. The classification system can be a rule based classification system and/or semantic web classification system.

The classification system is assumed to be rules-based, but other classification systems, such as a knowledge based intent classification system utilizing semantic web technology, and specifically automated reasoning are equally applicable. The system can be provided with product descriptions, for example a set of JDF product intent files that all represent the same product type. The system also starts with a pre-defined set of characteristics that are used for classifying the JDF product intent files as a specific product type. In the rules-based classification system, the set of characteristics are related to the pre-conditions of the various classification rules. In the semantic web based classification system, the set of characteristics is defined as a characteristics ontology and used to describe the properties of the product descriptions in a product description ontology. Logic-based restrictions are used to define the product description concepts which provide for the semantic automated reasoning to perform the classification into product descriptions.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD ROMs and transmission-type media such as analogue or digital communications links. The logical operation steps depicted in FIGS. 2-3 can, for example, be implemented in the context of such a software module.

Figure 1:
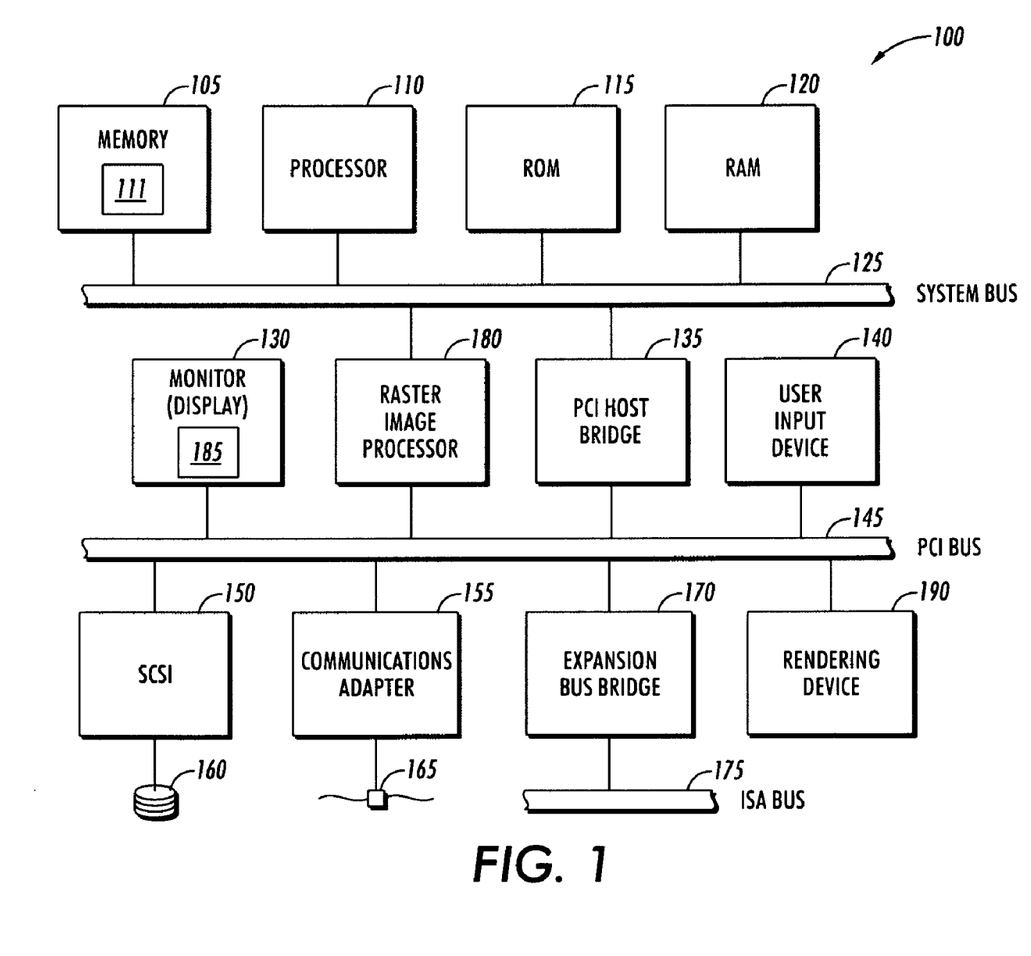
FIG. 1 illustrates a block diagram of a data-processing apparatus, which can be utilized for automatically adding new class definitions to a classification system, in accordance with a preferred embodiment.

Referring to the drawings and in particular to FIG. 1, there is depicted a data-processing apparatus 100 which can be utilized for automatically adding new class definitions to a classification system in accordance with a preferred embodiment. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a processor (CPU) 110, a Read-Only memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

Data-process apparatus 100 thus includes CPU 110, ROM 115, RAM 120, and a rendering device 190 (e.g., printer, copier, scanner, etc.), which are also coupled to a PCI (Peripheral Component Interconnect) local bus 145 of data-processing apparatus 100 through PCI host-bridge 135. The PCI Host Bridge 135 can provide a low latency path through which processor 110 may directly access PCI devices mapped anywhere within bus memory and/or input/output (I/O) address spaces. PCI Host Bridge 135 also can provide a high bandwidth path for allowing PCI devices to directly access RAM 120.

A communications adapter 155, a small computer system interface (SCSI) 150, a raster image processor (RIP) 180, and an expansion bus-bridge 170 are also attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

The user interface 185 allows for the modification of certain characteristics of a printed image, such as, for example, lightness/darkness, contrast, highlights, shadows, and color cast. In this regard, a user actuates the appropriate keys on the user interface 185 to adjust the parameters of a print job. A user can access and operate the rendering device 190 using the user interface 185. The classification system can be a software module such as, for example, the module 111 of apparatus 100 depicted in FIG. 1. The classification system is assumed to be rules-based, but other classification systems, such as a knowledge based intent classification system utilizing semantic web technology, and specifically automated reasoning, are equally applicable. Considering the fact that a product description must always be transformed into a set of processing instructions in order to actually create the described product, one of the pre-requisites for the automated conversion of intent to process is a well-defined product description. An example is JDF product intent.

The system starts with a pre-defined set of characteristics that are used for classifying the JDF product intent files as a specific product type. Examples of such characteristics includes the required binding (e.g., for saddle stitch, side stitch, soft cover), the required folding (e.g., for middle fold, no fold) and the finished dimensions of the product (e.g., for 8.5×11 or 6×4). In a rules-based classification system, the set of characteristics can be related to the pre-conditions of the various classification rules. In the semantic web based classification system, the set of characteristics is defined as a characteristics ontology and used to describe the properties of the product descriptions in a product description ontology. Logic-based restrictions are used to define the product description concepts which provide for the semantic automated reasoning to perform the classification into product descriptions.

Figure 2:
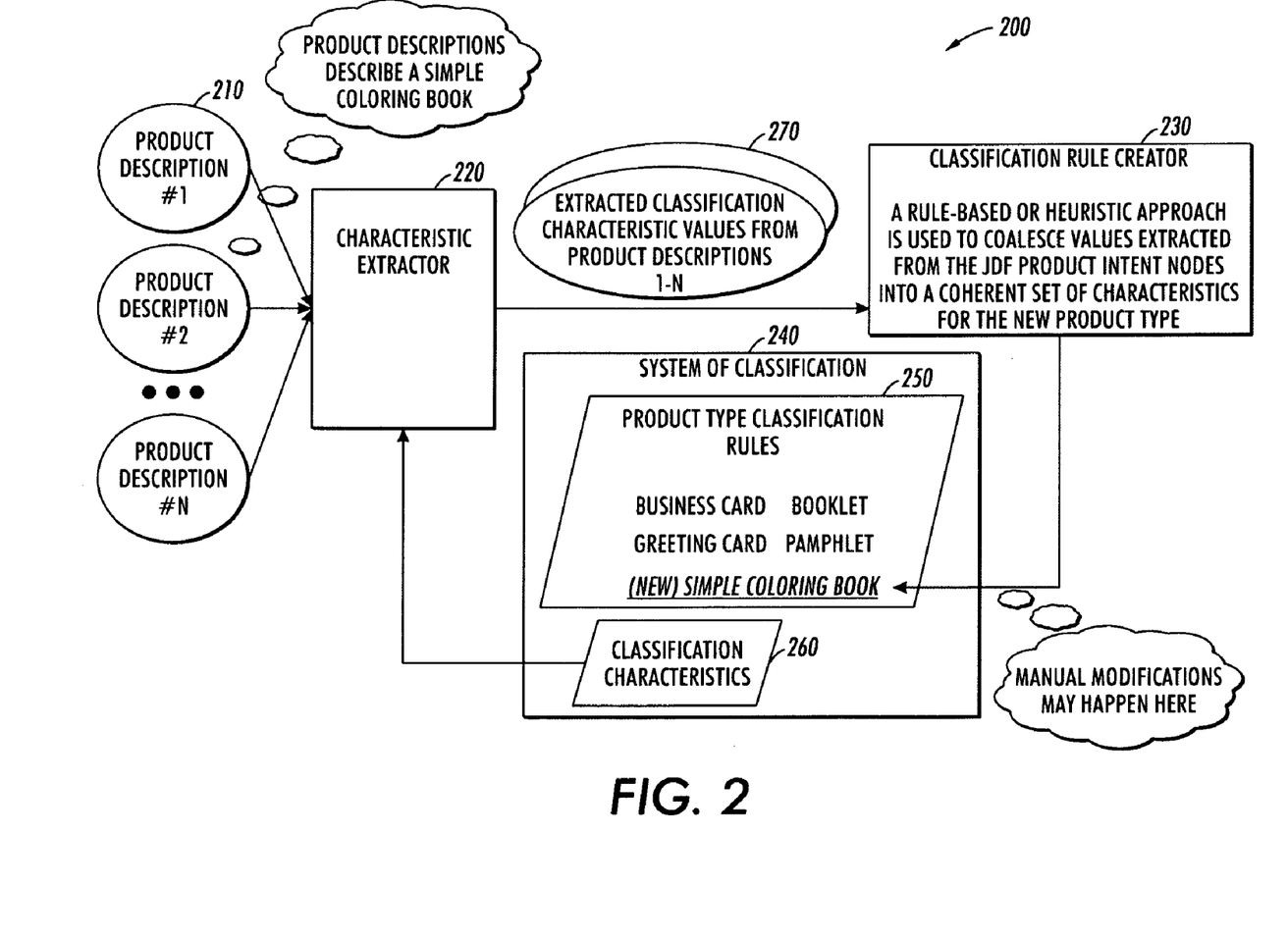
FIG. 2 illustrates a block diagram of operations between modules, in accordance with a preferred embodiment.

Referring to FIG. 2, a plurality of product descriptions 210 can be compared to a predefined set of classification characteristics 260 and the information relevant to each classification characteristic can then be extracted using a characteristic extractor 220 from the various product descriptions 210. The plurality of extracted classification characteristics 270 are then transformed into a new set of classification rules for the new product type by the classification rule creator 230. The newly created classification rules are then added to the System of Classification 240. Specifically, a new set of rules for the new product type are added to the product type classification rules 250.

Figure 3:
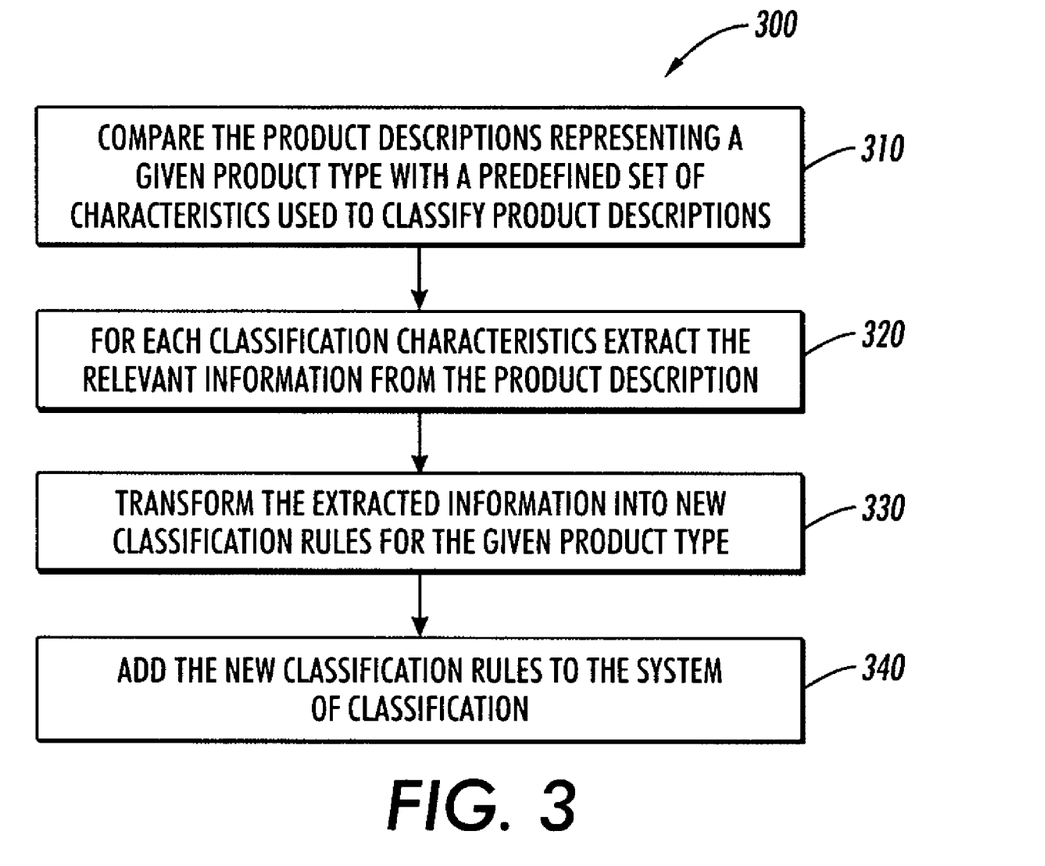
FIG. 3 illustrates a high level flow chart of operations illustrating logical operational steps of a method for automatically adding classification rules for classifying a product description into a product type based on the classification system, in accordance with a preferred embodiment.

Referring to FIG. 3 a high level flow chart of operations illustrating logical operational steps of a method 300 for automatically adding new classification rules for a new product type to the classification system is illustrated, in accordance with a preferred embodiment. The product description representing a given product type can be compared with the pre-defined set of characteristics, as illustrated at block 310. The relevant information regarding classification can be extracted from individual real product description, as shown at block 320. The extracted information can be coalesced and transformed into a new set of classification rules, as shown at block 330. A rule-based system or other heuristic system can certainly be used to decide how the information can be coalesced and transformed into a new set of classification rules. The new classification characteristics can now be manually modified if desired. Once such method is to first transform the information into a decision table and then transforms the decision table into a set of rules. The new classification rules for the new product type can then be added to the system of classification 340 for future use in classifying product descriptions.

Figure 4:
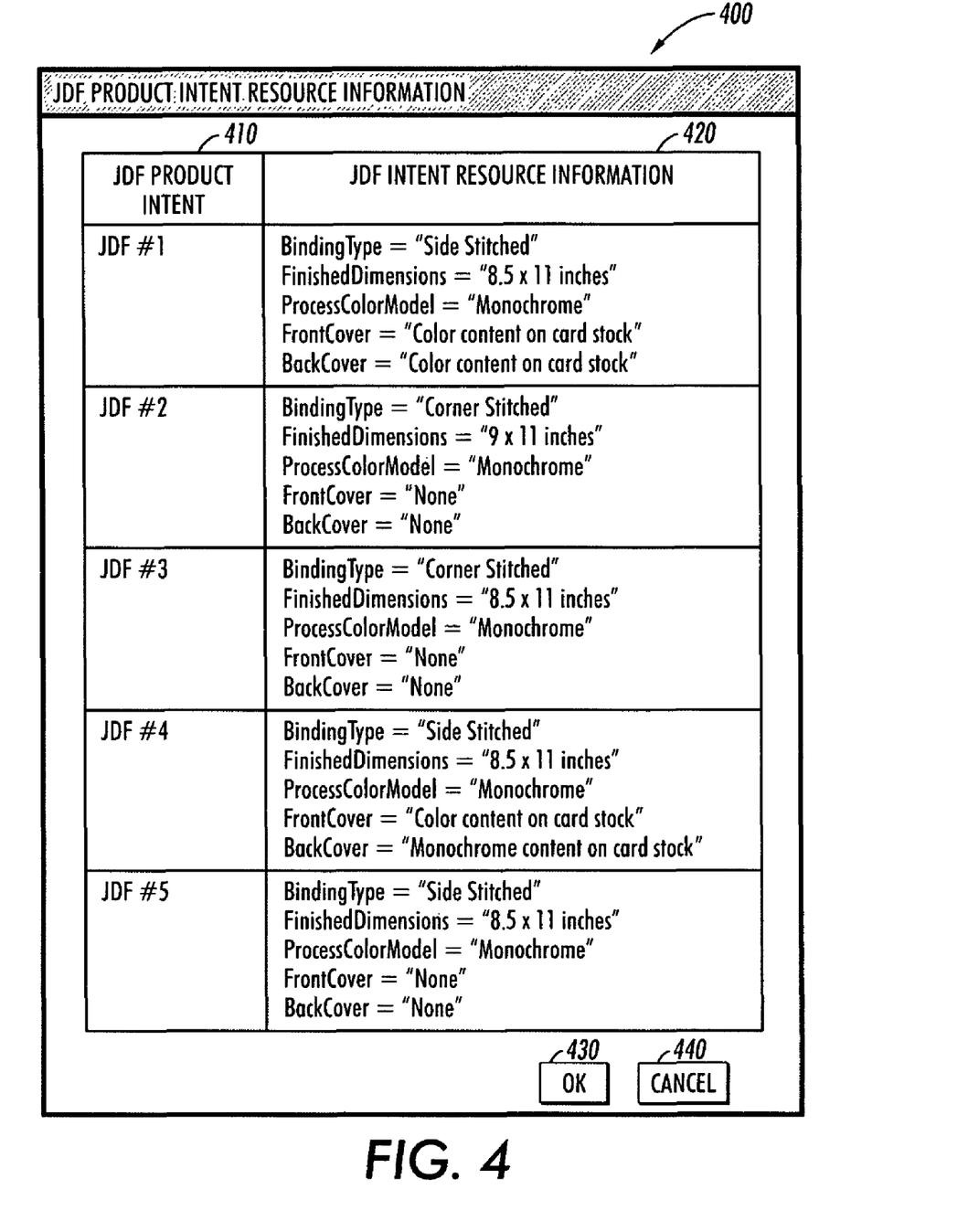
FIG. 4 illustrates an exemplary embodiment of a graphical user interface illustrating JDF product intent resource information, in accordance with a preferred embodiment.

Referring to FIG. 4 an exemplary embodiment of a graphical user interface 400 illustrating JDF product intent resource information is illustrated, in accordance with a preferred embodiment. Note that GUI window 400 can be implemented utilizing a GUI such as the GUI 185 depicted in FIG. 1 and can be provided by a module, such as, for example, module 111. GUI window 400 can be displayed via a display device such as monitor 130 depicted in FIG. 1 and implemented via the GUI 185. Note that a GUI window 400 as utilized herein generally constitutes a portion of a monitor screen that contains its own document or message. The GUI window 400 includes JDF product intent files 410 all of which represent a "Simple Coloring Book" with JDF intent resource information 420. The user can accept the process by clicking the ok button 430 displayed within GUI window 400. The user can also cancel the present job by "clicking" the graphically displayed cancel button 440.

Figure 5:
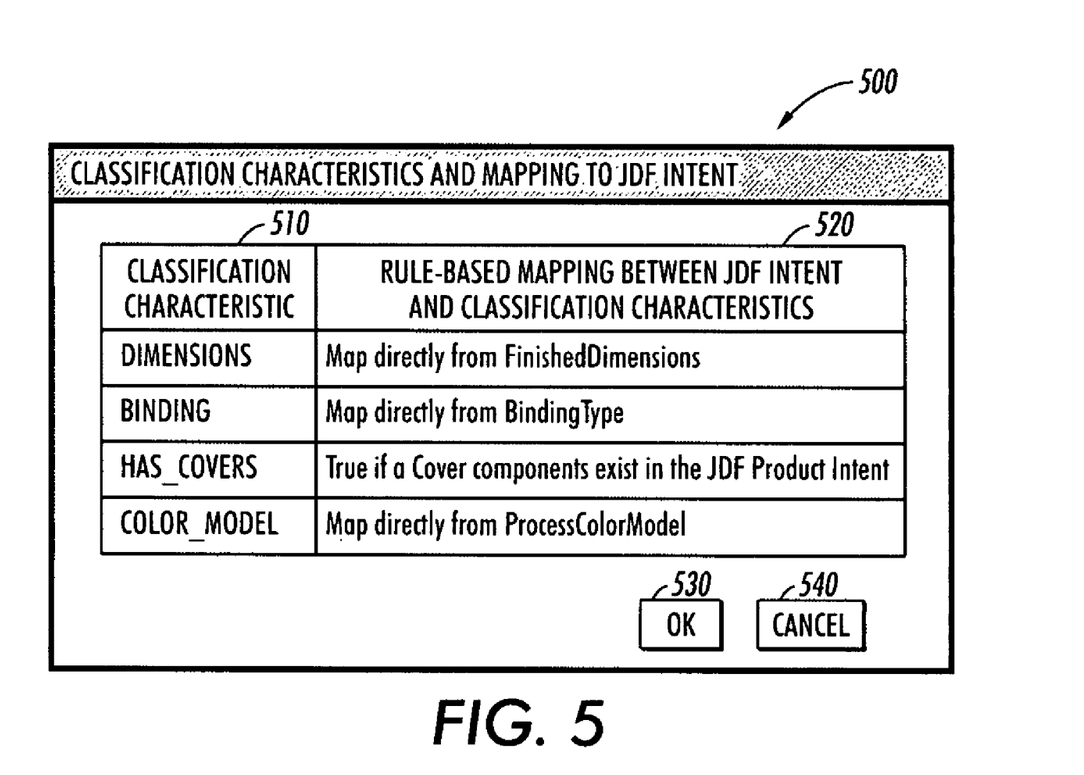
FIG. 5 illustrates another exemplary embodiment of a graphical user interface illustrating classification characteristics and mapping to JDF intent, in accordance with a preferred embodiment.

Referring to FIG. 5 another exemplary embodiment of a graphical user interface 500 illustrating classification characteristics and mapping to JDF intent is illustrated, in accordance with a preferred embodiment. Note that in FIGS. 4-7, identical or similar blocks are generally indicated by identical reference numerals. The GUI window 500 includes classification characteristics 510 and rules based mapping 520 between JDF intent 410 and classification characteristics 510. The classification characteristics 510 include a pre-defined set of characteristics that are used by the classification system. The rules-based mapping 520 can be utilized to map JDF intent resource information 420 and the classification characteristics 510. The user can accept the process by clicking the ok button 530 displayed within GUI window 500. The user can also cancel the present job by "clicking" the graphically displayed cancel button 540.

Figure 6:
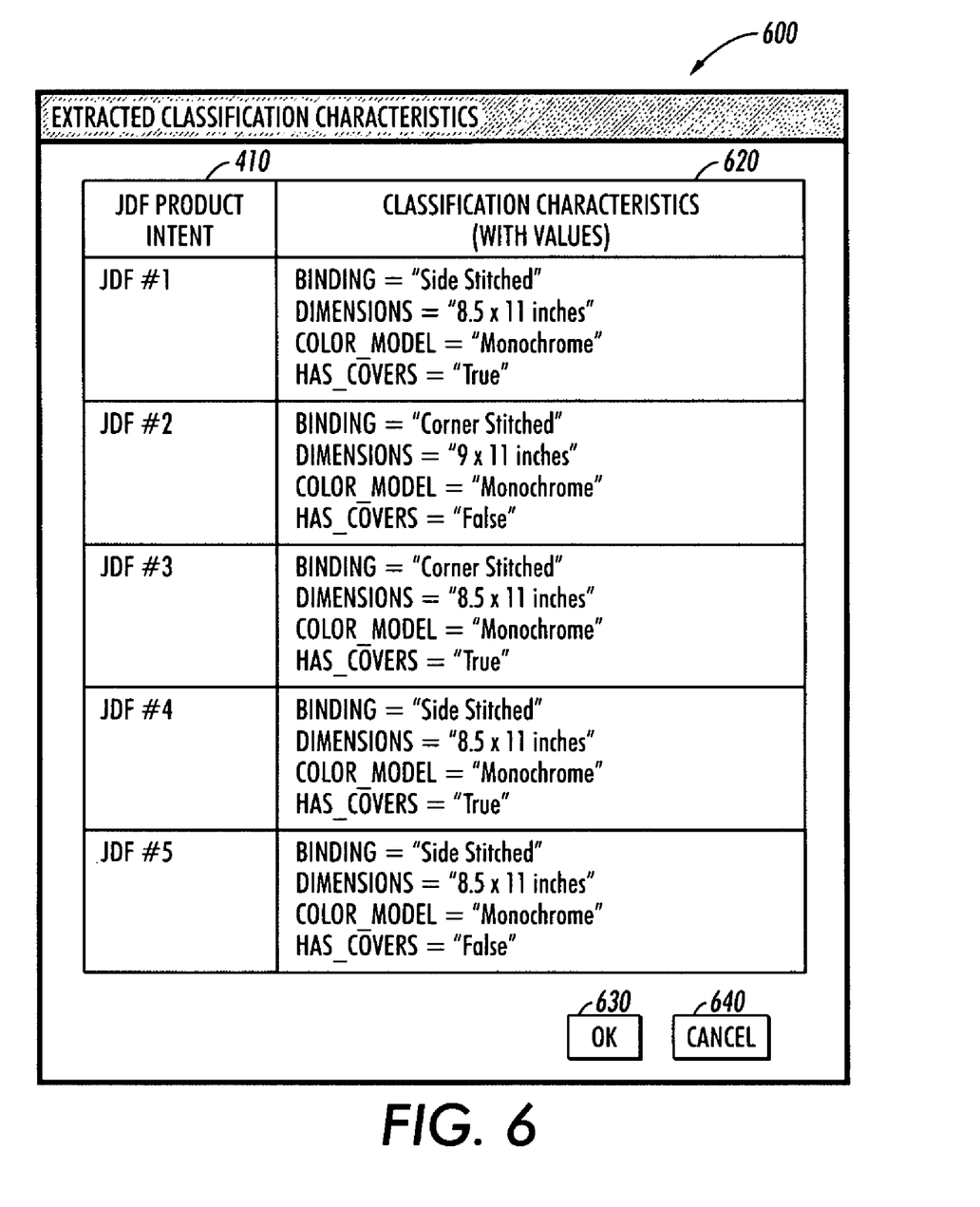
FIG. 6 illustrates another exemplary embodiment of a graphical user interface illustrating extracted classification characteristics, in accordance with a preferred embodiment.

Referring to FIG. 6 another exemplary embodiment of a graphical user interface 600 illustrating extracted classification characteristics is illustrated, in accordance with a preferred embodiment. The rules-based mapping 520 can be applied between JDF intent 410 and classification characteristics 510 in order to provide an extracted classification characteristics 620 with values. The JDF intent 410 representing a "Simple Coloring Book" can be mapped using the rules-based mapping 520 in order to extract relevant information regarding classification from individual JDF product intent files 410. The user can accept the process by clicking the ok button 630 displayed within GUI window 600. The user can also cancel the present job by "clicking" the graphically displayed cancel button 640.

Figure 7:
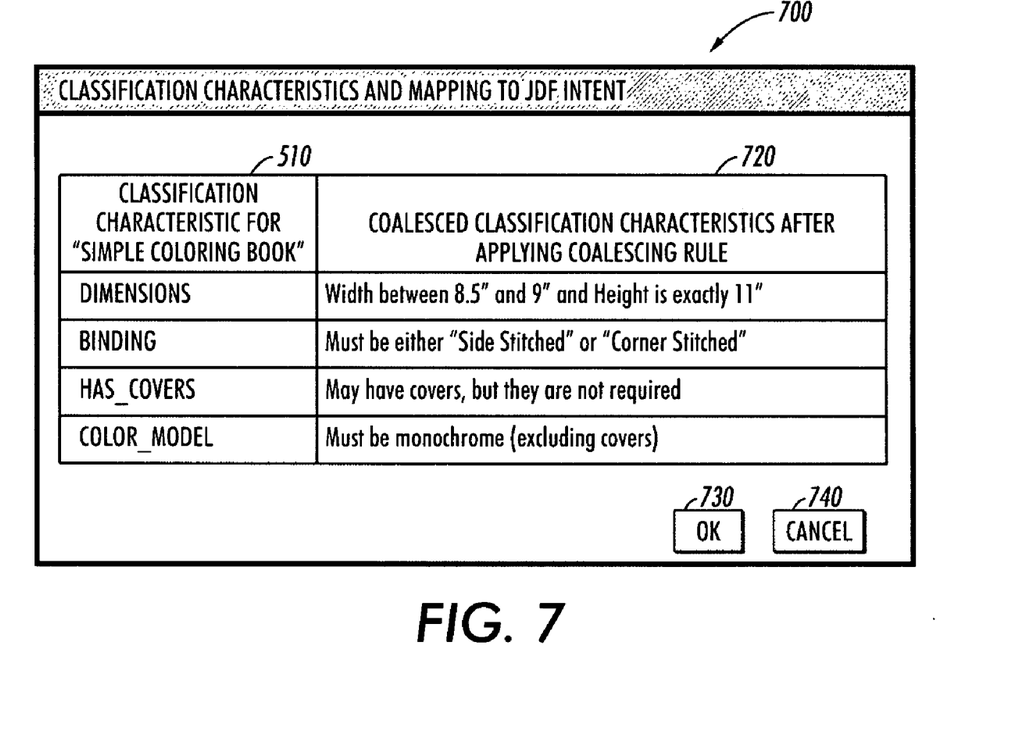
FIG. 7 illustrates another exemplary embodiment of a graphical user interface illustrating coalesced classification characteristics, in accordance with a preferred embodiment.

FIG. 7 illustrates another exemplary embodiment of a graphical user interface 700 illustrating coalesced classification characteristics, in accordance with a preferred embodiment. After characterization information 620 is extracted from the individual JDF product intent files 410 it is coalesced using a set of coalescing rules. The coalescing rules can be applied to the JDF product intent files 410. The coalescing rules utilized in this example includes, a pre-condition for the classification characteristic 510 can be created if the characteristics 510 are common to all the JDF intent files 410. A pre-condition for the binding classification characteristic 510 can be created if more than one BindingType is present. A pre-condition for the dimensions classification characteristic 510 that represents the entire range of values of the finished dimensions can be created if more than one finished dimensions is present in the JDF intent files 410.

The coalescing rules can be applied to the JDF intent file 510, and the new coalesced classification characteristics 720 for a "Simple Coloring Book" are then written into a decision table that is an abstraction of the JDF rule-based classification system. The new coalesced classification characteristics 720 for a "Simple Coloring Book" can be manually modified if desired. The new coalesced classification characteristics 720 are codified in the decision table hence it can be easily modified. Other automated reasoning can also be done as well, such as validation that the new coalesced classification characteristics 720 are consistent with each other and with the existing classification rules. The decision table is then automatically transformed into new classification rules using existing functionality provided by the Drools rules engine package. The user can accept the process by clicking the ok button 730 displayed within GUI window 700. The user can also cancel the present job by "clicking" the graphically displayed cancel button 740.

In the semantic web based classification system, the set of characteristics is defined as a characteristics ontology and used to describe the properties of the product descriptions in a product description ontology. Logic-based restrictions are used to define the product description concepts which provide for the semantic automated reasoning to perform the classification into product descriptions. For example, the semantic concept "Simple Coloring Book" as shown in FIG. 7 can be added as a subclass of product description 210 in the product description ontology. "Simple Coloring Book" can inherit the "hasBinding" property, which specifies the binding characteristic. The "hasBinding" property can be populated with logical assertions such as "hasBinding someValuesFrom SideStitched or CornerStitched" and "hasBinding cardinality" exactly from the results determined in the coalescing step as shown in FIG. 6. Similarly, logical assertion can be added for dimensions, "has_covers", and "color_model". The automated reasoning can then be used to classify other product intents, which match this pattern as "Simple Coloring Book's" utilizing the new logical assertions.

Based on the foregoing it can be appreciated that a system can be provided, through the use of one or more software modules as described above, which results in automatically adding new classifications, including product description into a product type, into an already existing classification system. The method of automatically classifying the product description described herein addresses many of the problems with traditional classifying techniques. The main advantage of this method is that it will automatically classify product description into a product type without the knowledge of underlying classification system and is applicable to many forms of classification systems. Time is also saved because there is no need for administration support to manually classify product description into a product type.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically adding new class definitions to a classification system, comprising:
   determining a print product description and classifying said print product description into at least one class utilizing a predefined set of characteristics that are related to a print product type in a classification system, wherein said print product description comprises at least one Job Definition Format (JDF) product intent node for describing print products and print processing steps;
   comparing said print product description with said predefined set of characteristics concerning classifying said print product description and extracting a plurality of relevant information from said print product description; and
   coalescing and transforming said plurality of relevant information into a set of new classification rules in order to represent a new print product type and automatically classifying said print product description that represents said new print product type utilizing said set of new classification rules.

2. The method of claim 1 wherein said classification system comprises of a rules-based classification system and/or a semantic web-based classification system.

3. The method of claim 2 wherein said predefined set of characteristics in said rules-based classification system comprises one or more pre-conditions for a plurality of classification rules.

4. The method of claim 2 wherein said predefined set of characteristics in said semantic web-based classification system comprises characteristics ontology referenced by said print product description.

5. The method of claim 1, further comprising:
   modifying and/or removing said set of new classification rules in a form consistent with said predefined set of characteristics.

6. The method of claim 1, further comprising;
   transforming said plurality of relevant information into a decision table and then transforming said decision table into said set of new classification rules.

7. The method of claim 1, wherein said classification system comprises a user interface or a module operable to resolve said plurality of processing instructions into said new print product type.

8. The method of claim 1 wherein said classification system automatically utilizes said predefined set of characteristics in order to classify said plurality of processing instructions into said new print product type.

9. A computer implemented system automatically adding new class definitions to a classification system, comprising:
   a data-processing apparatus;
   a module executed by said data-processing apparatus, said module and said data-processing apparatus being operable in combination with one another to:
   determine a print product description and classify said print product description into at least one class utilizing a predefined set of characteristics that are related to a print product type in a classification system, wherein said print product description comprises at least one Job Definition Format (JDF) product intent node for describing print products and print processes;
   compare said print product descriptions with said predefined set of characteristics concerning classifying said print product description and extracting a plurality of relevant information from said print product description; and
   coalesce and transform said plurality of relevant information into a set of new classification rules in order to represent a new print product type and automatically classifying said print product description that represents said new print product type utilizing said set of new classification rules.

10. The computer implemented system of claim 9 wherein said classification system comprises of a rules-based classification system and/or a semantic web-based classification system.

11. The computer implemented system of claim 10 wherein said predefined set of characteristics in said rules-based classification system comprises of pre-conditions of a plurality of classification rules.

12. The computer implemented system of claim 10 wherein said predefined set of characteristics in said semantic web-based classification system further comprises a characteristics ontology referenceable by said print product description.

13. The computer implemented system of claim 9 wherein said module and said data-processing apparatus are operable in combination with one another to:
   modify and/or remove said set of new classification rules in a form consistent with said predefined set of characteristics.

14. The computer implemented system of claim 9 wherein said module and said data-processing apparatus are operable in combination with one another to:

transform said plurality of relevant information into a decision table and then transforming said decision table into said set of new classification rules.

15. The computer implemented system of claim 9, wherein said classification system comprises a user interface or a module operable to resolve said print product description into said new print product type.

16. The computer implemented system of claim 9, wherein said classification system automatically utilizes said predefined set of characteristics in order to classify said print product description into said new print product type.

* * * * *